United States Patent [19]

Park

[11] Patent Number: 4,884,140
[45] Date of Patent: Nov. 28, 1989

[54] VIGNETTING COMPENSATING CIRCUIT FOR A VIDEO CAMERA

[75] Inventor: Jong B. Park, Seoul, Rep. of Korea

[73] Assignee: Goldstar Co., Ltd., Seoul, Rep. of Korea

[21] Appl. No.: 266,099

[22] Filed: Nov. 2, 1988

[30] Foreign Application Priority Data

Nov. 18, 1987 [KR] Rep. of Korea ............ 19978/1987

[51] Int. Cl.$^4$ .................. H04N 5/208; H04N 5/14; H04N 5/235; H04N 5/335
[52] U.S. Cl. ................................ 358/168; 358/166; 358/160; 358/213.13
[58] Field of Search .............. 358/213.13, 213.16, 358/213.18, 225, 909, 160, 166, 168, 169, 172, 174, 176, 163

[56] References Cited

U.S. PATENT DOCUMENTS

| | | | |
|---|---|---|---|
| 3,941,925 | 3/1976 | Busch et al. | 358/183 |
| 3,989,888 | 11/1976 | Busch et al. | 358/182 |
| 4,240,103 | 12/1980 | Poetsck et al. | 358/163 |
| 4,628,362 | 12/1986 | Waehner | 358/168 |
| 4,639,781 | 1/1987 | Rucci et al. | 358/163 |
| 4,665,432 | 5/1987 | Shima | 358/180 |

Primary Examiner—John K. Peng
Attorney, Agent, or Firm—Rosen, Dainow & Jacobs

[57] ABSTRACT

A vignetting compensating circuit for a video camera utilizing the horizontal synchronizing signal and the vertical synchronizing signal. The circuit prevents vignetting on the screen from a signal generated by a video camera with a zoom lens by obtaining and adding inverse parabolic wave form voltages corresponding to the cycles of the horizontal synchronizing signal and the vertical synchronizing signal and controlling the amplification factors of a voltage controlled amplifier for the video signal by the added voltage.

4 Claims, 2 Drawing Sheets

VIGNETTING COMPENSATING CIRCUIT FOR A VIDEO CAMERA

BACKGROUND OF THE INVENTION

The present invention relates to a vignetting compensating circuit for a video camera which can compensate a vignetting phenomenon occurring by a zoom lens in a video camera, that is, the phenomenon that the circumferential brightness of a screen becomes lower than the central brightness thereof.

In a conventional video camera, the video signal is output to a monitor or a television set without compensation thereof. As a result, there is a disadvantage in that a picture of good quality is not obtained because the circumferential brightness of a screen presented on a monitor or a television set is lower than the central brightness thereof.

SUMMARY OF THE INVENTION

Therefore, the object of the present invention is to provide a vignetting compensating circuit with a simple structure which enables the whole brightness of screen to be more uniform by compensating the vignetting.

The above object is realized by; obtaining the inverse parabolic wave form voltage corresponding to a cycle of horizontal synchronizing signal therefrom; obtaining the inverse parabolic wave form voltage from a vertical synchronizing signal which corresponds to a cycle of the vertical synchronizing signal; adding said two wave form voltages to one another; and controlling the amplification factor of a voltage controlled amplifier to which video signal is input, by the added voltage.

DETAILED DESCRIPTION OF THE INVENTION

Figure 1:
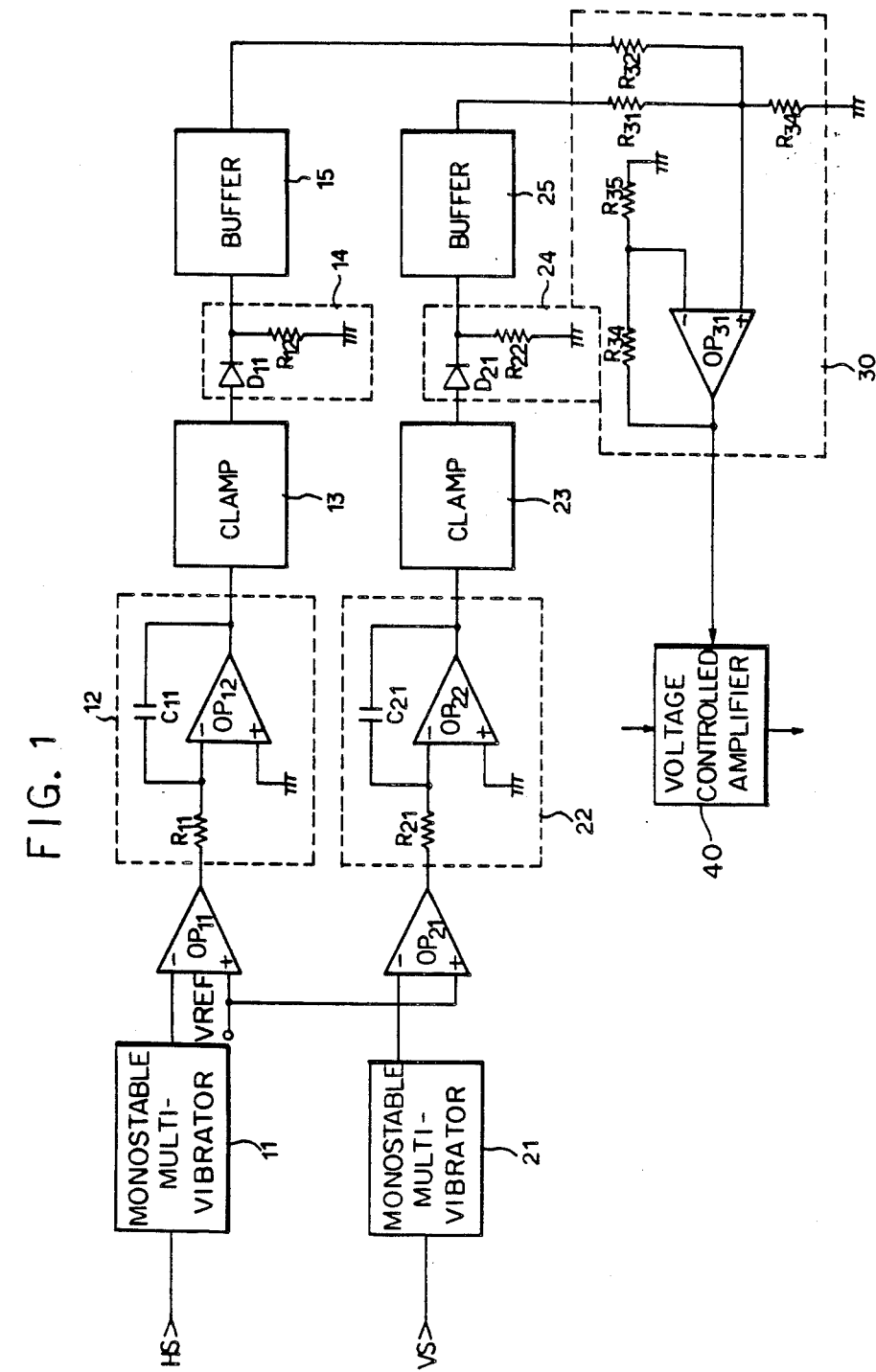
FIG. 1 is a vignetting compensating circuit diagram according to the present invention.

As shown in FIG. 1, the vignetting compensating circuit according to the present invention is comprised of monostable multivibrators 11, 21 which output signals of the width of ½ HT (Wherein, HT represents a cycle of a horizontal synchronizing signal) and ½ VT (Wherein, VT represents a cycle of a vertical synchronizing signal), respectively, in response to a horizontal synchronizing signal HS and a vertical synchronizing signal VS, operational amplifiers $OP_{11}$, $OP_{21}$ which amplify the output signals of said monostable multivibrators 11, 21 by comparing them with a reference voltage Vref, integrators 12, 22 comprised of resistors $R_{11}$, $R_{21}$, capacitors $C_{11}$, $C_{21}$ and operational amplifiers $OP_{12}$, $OP_{22}$, respectively, and which integrate the output signals of the operational amplifiers $OP_{11}$, $OP_{21}$, clamp circuits 13, 23 which convert the minimum values of the integrators 12, 22 into zero volt (0 V), wave form shaping circuits 14, 24 which make the output signals of said clamp circuits 13, 23 into parabolic wave forms by shaping thereof, buffers 15, 25 which buffer and amplify the output signals of said wave form shaping circuits 14, 24 an adder 30 composed of resistors $R_{31}$-$R_{35}$ and an operational amplifier $OP_{31}$ and which adds the output signals of said buffers 15, 25 one another, and a voltage controlled amplifier 40 which amplifies the video signals taken by a video camera in proportion to the output signal of said adder 30.

Figure 2:
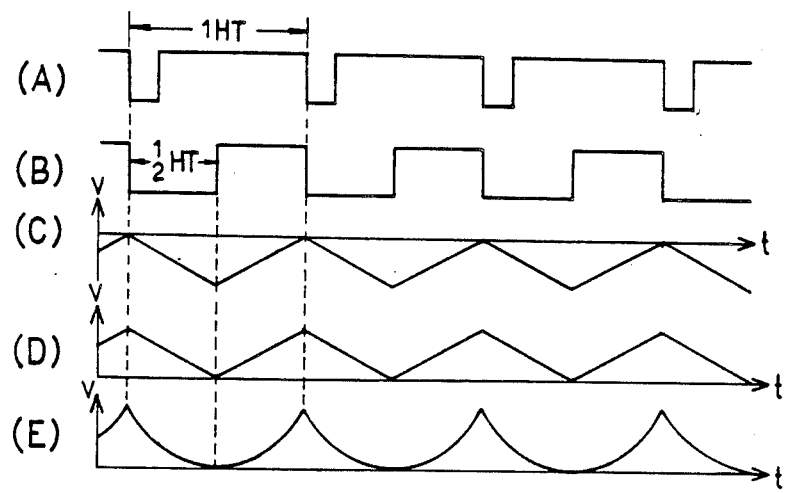
FIGS. 2(A-E) and FIGS. 3(A-E) are wave form views of the respective elements of FIG. 1.
Figure 3:
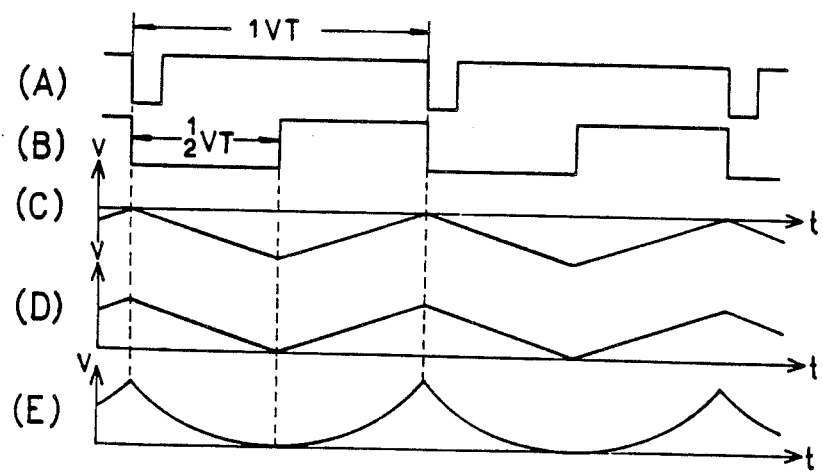

Hereafter, the operation and effect of the vignetting compensating circuit constructed as above will be explained in detail with reference to FIG. 2 and FIG. 3.

As shown in FIG. 2(A) and FIG. 3(A), respectively, when horizontal synchronizing signal HS and vertical synchronizing signal VS are input to monostable multivibrators 11, 21, the monostable multivibrators 11, 21 begin to output pulse signals of ½ HT and of ½ VT in response to the cycles of said horizontal synchronizing signal HS and vertical synchronizing signal VS as shown in FIG. 2(B) and FIG. 3(B), respectively.

The pulse signals of ½ HT and of ½ VT are amplified through operational amplifiers $OP_{11}$, $OP_{21}$, and then integrated as shown in FIG. 2(C) and FIG. 3(C) by integrators 12, 22. At this moment, the gradient of the integrated signals is determined by the value of resistors $R_{11}$, $R_{21}$ and capacitors $C_{11}$, $C_{21}$, and its maximum value is zero volt (0 V). And, the output signals of said integrators 12, 22 are clamped to the minimum value of zero volt (0 V) through clamp circuits 13, 23 as shown in FIG. 2(D) and FIG. 3(D), and shaped into the parabolic waves through wave form shaping circuits 14, 24 as shown in FIG. 2(E) and FIG. 3(E). The shaped signals shaped in the wave form shaping circuits 14, 24 are input and added to an adder 30 through buffers 15, 25, and the output signal of the adder 30 is applied to a control terminal of a voltage controlled amplifier 40 to control the amplification factor of a video signal generated by a video camera. At this time, the output signal of the adder 30 is low when the video signal of the central portion of screen is input to the voltage controlled amplifier 40, while the output signal of the adder 30 is high when the circumferential video signal of the screen is input to the voltage controlled amplifier 40, thereby compensating the vignetting. That is to say, because the amplification factor of both sides becomes higher than the central portion thereof according to the voltage of the parabolic waves as shown in FIG. 2(E) in the horizontal axis of a screen, and because the amplification factor of the upper and lower sides becomes higher than that of the central portion of screen according to the voltage of the parabolic waves as shown in FIG. 3(E) in the vertical axis of a screen, the phenomenon that the circumferential brightness of the screen is lower than the central brightness thereof is compensated.

As described above in detail, the vignetting compensating circuit according to the present invention has the advantages in that the whole brightness of the screen can be made more uniform by compensating the vignetting phenomenon of the video signals output from a video camera, and that the circuit is simply constructed by utilizing the horizontal synchronizing signal and the vertical synchronizing signal results in that the application thereof is made easier.

What is claimed is:

1. A vignetting compensating circuit for a video camera comprising:
   monostable multivibrators (11), (21) for outputting pulse signals corresponding to a width of one-half-cycle of a horizontal synchronizing signal (HS) and of a vertical synchronizing signal (VS);
   operational amplifiers ($OP_{11}$), ($OP_{21}$) for amplifying the output signals of said monostable multivibrators (11), (21);

integrators (12), (22) for integrating the output signals of said operational amplifiers ($OP_{11}$), ($OP_{21}$);

clamp circuits (13), (23) for clamping the minimum value of the output signals of said integrators (12), (22) to zero volt;

wave form shaping circuits (14), (24) for shaping the output signals of said clamp circuits (13), (23) into parabolic waves;

buffers (15), (25) for buffering and amplifying the output signals of said wave form shaping circuits (14), (24);

an adder (30) for adding the output signals of said buffers (15), (25) one to another; and a voltage controlled amplifier (40) for amplifying the video signal taken by a video camera in proportion to the output voltage of said adder (30).

2. A vignetting compensating circuit for a video signal from a video camera, comprising a voltage controlled amplifier for receiving said video signal and for outputting an amplified version of said video signal and having an input for receiving a compensating signal for modifying said video signal, means for receiving the horizontal synchronizing signal for said video signal and producing a signal having a parabolic shaped waveform whose period corresponds to that of the horizontal synchronizing signal, means for receiving the vertical synchronizing signal for said video signal and producing a signal having a parabolic shaped waveform whose period corresponds to that of the vertical synchronizing signal, and means for connecting the parabolic signals to the amplifier input to modify the video signal to compensate for vignetting.

3. A circuit as claimed in claim 2 wherein the video camera has a zoom lens, and the two parabolic signals are combined before being applied to the amplifier.

4. A circuit as claimed in claim 3 wherein each synchronizing signal receiving means comprises means for producing a pulse width equal to one-half the synchronizing signal's period, integrating means, and inverse parabolic waveform generating means.

* * * * *